A. PANTENBURG 3,549,250
SLIDE PROJECTOR WITH CONTINUOUSLY VARIABLE DETAIL MAGNIFICATION
Filed April 29, 1968
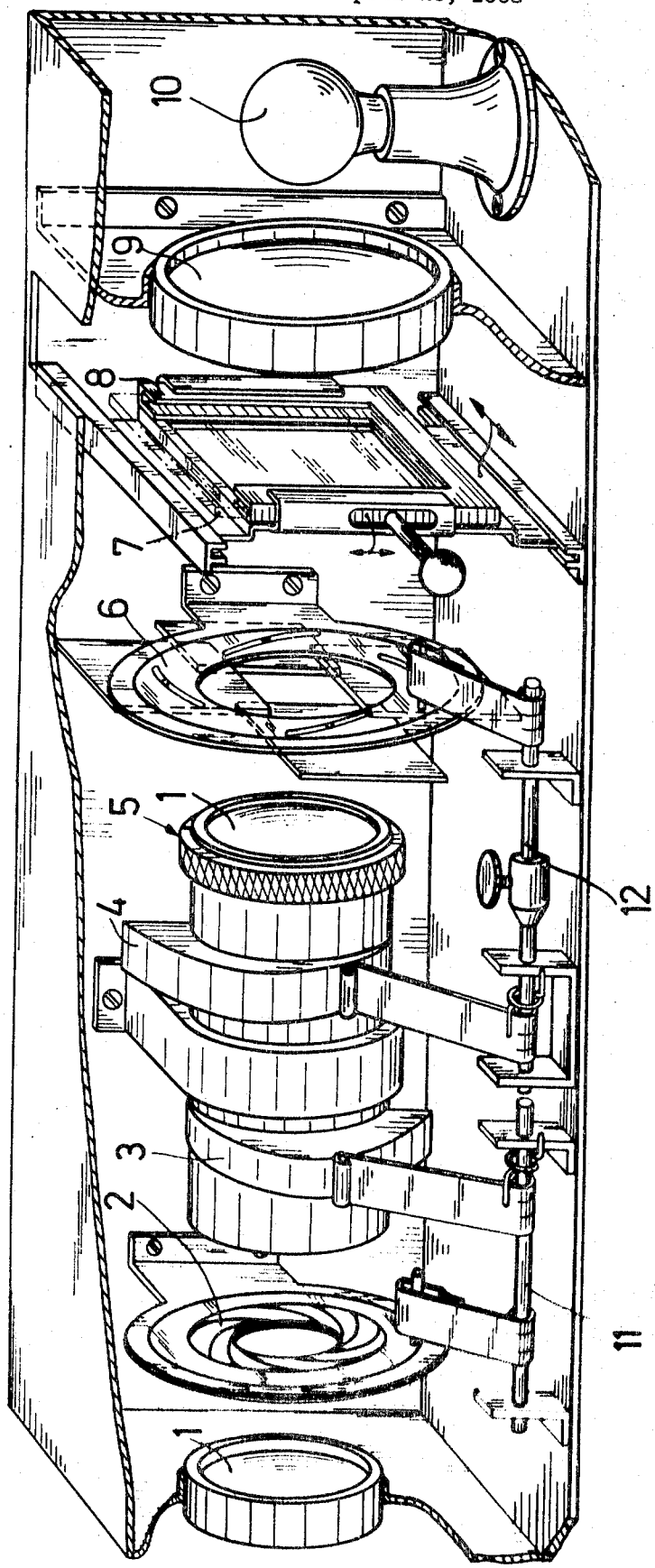

United States Patent Office 3,549,250
Patented Dec. 22, 1970

3,549,250
SLIDE PROJECTOR WITH CONTINUOUSLY VARIABLE DETAIL MAGNIFICATION
Axel Pantenburg, Rodenkirchen-Hahnwald, Cologne, Germany (65/X Staudinger Str. 8, Munich 83, Germany)
Filed Apr. 29, 1968, Ser. No. 725,092
Int. Cl. G03b 21/14
U.S. Cl. 353—97                     3 Claims

ABSTRACT OF THE DISCLOSURE

This invention relates to optical systems and more particularly to a slide projector for producing a zooming effect on a screen or exclusive projecting a slide detail independent of its geometric position within the frame, the screen image of which is automatically adapted to full screen size and constant brightness.

This projector comprising in combination a movable slide carrier, a zoom lens, a variable slide mask and a variable aperture, all arranged on a common optical axis and having coupling means, fitting the adjustments thereof together.

---

In the technics of moving pictures a well known effect is made by zooming the object. It is to draw viewer's attention to significant details by gradually magnifying them on the screen, thereby banishing insignificant marginals. This popular practice is based on the variation of the focal length of the taking lens at shooting a scene. Later reproduction on a screen creates the impression to be drawn gradually closer towards the center of events. This however requires a continuous sequence of frames and is consequently limited to moving pictures technics. There is also the disadvantage that such a dramatization is to be prepared at shooting time and permanently recorded on the film to become an unavoidable fact at every showing thereafter.

There are constructions known to effect some animation in slide projection technics too by varying the image size or the detail to be projected by means of a lens panel with different lenses, a zoom lens or a slide mask respectively. Further a mechanism is known controlling the adjustment of a zoom lens by pivots, which pivots are to be fixed in different positions on the frames of the slides. These constructions are relating to other problems and not sufficient to produce such an animating effect of zooming known in moving picture technics or to give the comfort in exclusive projecting slide details, the screen image of which is automatically adapted to full screen size and constant brightness at every variation of the magnification scale.

It is a primary object of the present invention to realize the animating effect of zooming, known in moving picture technics, in slide projection technics too.

Another object is to give the full freedom of choice to the viewer to control the effect himself as he likes to do.

A further object is exclusive projecting of a slide detail independent of its geometric position within the frame, the screen image of which is automatically adapted to full screen size and constant brightness.

Other objects and advantages will become clear by the following description under reference to the accompanying drawing illustrating an embodiment of the invention.

The drawing shows from right to left the components in the order of light penetration. The condenser lens 9 concentrates the light rays sent through it from the lamp 10 in the known fashion into a beam of light. This beam is now passing through the slide. The slide 7 is held in the slide carrier 8 which can be moved in the horizontal and the vertical direction.

A masking device 6 is positioned nearby behind the slide. This device makes it possible to mask the light emerging from the illuminated slide in variable form. Designs of this kind are in existence. The design featured in this drawing utilizes four sliding plates, each of which is offset by 90 degrees to the optical axis; all moving in a vertical plane thereof, and each fitted with a pin. These pins scan spiral sections which are offset by 90 degrees, punched into a round disc. On rotating this disc, all four sliding plates move towards or away from the optical axis. The resulting area from which light is passing is thus made smaller or bigger.

The thus remaining section of the slide is projected by the zoom-lens system 1. Systems of this design are frequently used in cine cameras and are considered as sufficiently known. The intensity of illumination on the screen is controlled by a variable diaphragm 2. Diaphragms of this kind are also known. They are present in almost any camera. In practice, they are usually designed into the lens system. This drawing shows the diaphragm separate for reason of better detail.

The desired focal length of the lens system 1 is adjusted by a milled setting ring 5. Rotation of this ring immediately moves two cam plates 3 and 4. The significant feature of this invention is the coupling of the focal length adjustment with the adjustment of the slide masking device and the diaphragm.

This effect is realized in the drawing by two similar coupling mechanisms 11 and 12. They consist of a rotatable shaft with two rigidly mounted blades. These shafts may be made up from two separate sections connected by a sleeve and set screw as is demonstrated in the case of the right coupling mechanism 12. This would provide for any necessary adjustments or to neutralize the coupling mechanism for individual adjustments.

Whereas one blade is scanning its cam plate, the looped end of the other is controlling the setting pin of its component 2 or 6. Each scanning blade is pressed against its cam plate by a tensioning spring mounted on the shaft. This linkage arrangement provides for the setting of components 2 and 6 whenever setting ring 5 is moved.

The individual component movements are coordinated in such manner that at the reduction of the focal length of the lens system 1, which would immediately lead to the magnification of the whole slide area, the masking of the slide is narrowed down whereas the diaphragm opens up.

The configuration of the cam plates is also shown by the drawing. It is such that the size of the projected image on the screen and its brightness remains constant for all positions of the setting ring. This produces an effect similar to that in cinematography where the significant detail is gradually emphasized and the marginals disappear. It further permits the viewer to control the effect himself.

What is claimed is:

1. Slide projector for producing a zooming effect on a screen, comprising in combination
   a slide carrier for receiving the slide to be projected,
   a zoom lens for projecting the slide or a detail of it with a continuously variable magnification,
   a continuously variable masking device positioned near the slide for limiting said detail to be projected,
   a continuously variable aperture for varying the brightness of the screen image,
   all arranged on a common optical axis and having coupling means in connection with said zoom lens, said masking device and said aperture and adapted to keep constant the size and the brightness of the screen image at any variation of the magnification scale.

2. Slide projector as claimed in claim 1, the slide carrier of which is adapted for displacement in two directions, which are perpendicular to each other and to said optical axis.

3. Slide projector as claimed in claim 1, comprising further means to disengage said coupling means for individual adjustment of said zoom lens, said masking device and said aperture.

References Cited

UNITED STATES PATENTS

| | | | |
|---|---|---|---|
| 2,663,223 | 12/1953 | Hopkins | 350—184 |
| 3,183,770 | 5/1965 | Nyman, Jr., et al. | 355—64X |
| 3,213,750 | 10/1965 | Eggert | 353—97 |
| 3,353,891 | 11/1967 | Rosenberger | 350—184X |
| 3,354,776 | 11/1967 | Smitzer et al. | 353—76 |
| 3,438,689 | 4/1969 | Wehr | 350—184X |

FOREIGN PATENTS 1,281,559   12/1961   France _____ 353—97

WILLIAM D. MARTIN, JR., Primary Examiner

U.S. Cl. X.R.

350—184; 353—101; 355—64